(12) United States Patent
Christmas (10) Patent No.: US 10,514,658 B2
(45) Date of Patent: Dec. 24, 2019

(54) COLOR HOLOGRAPHIC DISPLAY SYSTEM

(71) Applicant: Dualitas Ltd, Buckinghamshire (GB)

(72) Inventor: Jamieson Christmas, Buckinghamshire (GB)

(73) Assignee: Dualitas Ltd, Knowlhill (GB)

( * ) Notice: Subject to any disclaimer, the term of this patent is extended or adjusted under 35 U.S.C. 154(b) by 182 days.

(21) Appl. No.: 15/565,828

(22) PCT Filed: Mar. 3, 2017

(86) PCT No.: PCT/GB2017/050585
§ 371 (c)(1),
(2) Date: Oct. 11, 2017

(87) PCT Pub. No.: WO2017/149328
PCT Pub. Date: Sep. 8, 2017

(65) Prior Publication Data
US 2018/0120768 A1  May 3, 2018

(30) Foreign Application Priority Data

Mar. 3, 2016 (GB) .................................. 1603703.8

(51) Int. Cl.
*G03H 1/30* (2006.01)
*G03H 1/02* (2006.01)
(Continued)

(52) U.S. Cl.
CPC ........... *G03H 1/30* (2013.01); *G02B 27/0103* (2013.01); *G03H 1/02* (2013.01); *G03H 1/0443* (2013.01);
(Continued)

(58) Field of Classification Search
None
See application file for complete search history.

(56) References Cited

U.S. PATENT DOCUMENTS

| 5,729,364 | A | * | 3/1998 | Bashaw | ............... | G03H 1/02 |
| | | | | | | 252/582 |
| 2013/0194644 | A1 | * | 8/2013 | Cable | ............... | G03H 1/2205 |
| | | | | | | 359/9 |
| 2019/0064738 | A1 | * | 2/2019 | Cole | ............... | G03H 1/2205 |

FOREIGN PATENT DOCUMENTS

| EP | 1457974 | 9/2004 |
| GB | 2496108 | 5/2013 |

(Continued)

OTHER PUBLICATIONS

Copending U.S. Appl. No. 16/112,153, filed Aug. 24, 2018.
(Continued)

*Primary Examiner* — Jennifer D. Carruth
(74) *Attorney, Agent, or Firm* — McDonnell Boehnen Hulbert & Berghoff LLP (57) ABSTRACT

A display system comprising a first plurality of pixels, a second plurality of pixels, a first Fourier transform lens and a second Fourier transform lens. The first plurality of pixels is arranged to display first holographic data corresponding to a first holographic reconstruction and receive light of a first wavelength. The a second plurality of pixels is arranged to display second holographic data corresponding to a second holographic reconstruction and receive light of a second wavelength. The first Fourier transform lens is arranged to receive spatially modulated light having a first wavelength from the first plurality of pixels and perform an optical Fourier transform of the received light to form the first holographic reconstruction at a replay plane, wherein the first holographic reconstruction is formed of light at the first wavelength. The second Fourier transform lens is arranged to receive spatially modulated light having a second wavelength from the second plurality of pixels and perform an optical Fourier transform of the received light to form the second holographic reconstruction at the replay plane,
(Continued)

wherein the second holographic reconstruction is formed of light at the second wavelength. The optical path length from the first Fourier transform lens to the replay plane is not equal to the optical path length from the second Fourier transform lens to the replay plane.

26 Claims, 4 Drawing Sheets

(51) Int. Cl.
      *G03H 1/22*       (2006.01)
      *G03H 1/04*       (2006.01)
      *G02B 27/01*      (2006.01)
      *H04N 9/31*       (2006.01)

(52) U.S. Cl.
     CPC ......... *G03H 1/2205* (2013.01); *G03H 1/2294* (2013.01); *G02B 2027/0112* (2013.01); *G03H 2001/0224* (2013.01); *G03H 2001/045* (2013.01); *G03H 2001/2207* (2013.01); *G03H 2001/2218* (2013.01); *G03H 2001/2271* (2013.01); *G03H 2001/303* (2013.01); *G03H 2222/13* (2013.01); *G03H 2222/18* (2013.01); *G03H 2225/52* (2013.01); *G03H 2225/61* (2013.01); *H04N 9/3105* (2013.01)

(56) References Cited

FOREIGN PATENT DOCUMENTS

| GB | 2498170 | 7/2013 |
|----|---------|--------|
| GB | 2501112 | 10/2013 |
| GB | 2518664 | 4/2015 |

OTHER PUBLICATIONS

Examination Report dated Aug. 24, 2017 for Great Britain Application No. GB 1603703.8 filed Mar. 3, 2016, 3 pages.
International Search Report and Written Opinion for International Searching Authority dated May 15, 2017 for International Application No. PCT/GB2017/050585 filed Mar. 3, 2017, 13 pages.
Li et al., "Color holographic magnification system based on spatial light modulators," Journal of the SID 24/2, 2016, pp. 125-129.
Combined Search and Examination Report dated Jan. 26, 2017 for Great Britain 1603703.8 filed Mar. 3, 2016, 5 pages.

\* cited by examiner

COLOR HOLOGRAPHIC DISPLAY SYSTEM

This application is a U.S. national phase application of International Patent Application no. PCT/GB2017/050585 filed Mar. 3, 2017, which claims the benefit of United Kingdom Patent Application no. 1603703.8 filed Mar. 3, 2016.

FIELD

The present disclosure relates a display system. More specifically, the present disclosure relates to a colour display system. Yet more specifically, the present disclosure relates to a colour holographic projector. Embodiments relate to a head-up display and near-eye device.

INTRODUCTION AND BACKGROUND

Light scattered from an object contains both amplitude and phase information. This amplitude and phase information can be captured on, for example, a photosensitive plate by well-known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

A computer-generated phase-only hologram may be "pixelated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal spatial light modulator (SLM). The SLM may be reflective meaning that modulated light is output from the SLM in reflection.

Each phase modulating element, or pixel, may vary in state to provide a controllable phase delay to light incident on that phase modulating element. An array of phase modulating elements, such as a Liquid Crystal On Silicon (LCOS) SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using an optical Fourier transform lens, to form the holographic reconstruction, or "image", in the spatial domain. Alternatively, no Fourier transform lens may be needed if the reconstruction takes place in the far-field.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object may be calculated.

The holographic reconstruction may be formed by illuminating the Fourier domain hologram and performing an optical Fourier transform, using a Fourier transform lens, for example, to form an image (holographic reconstruction) at a reply field such as on a screen.

Figure 1:
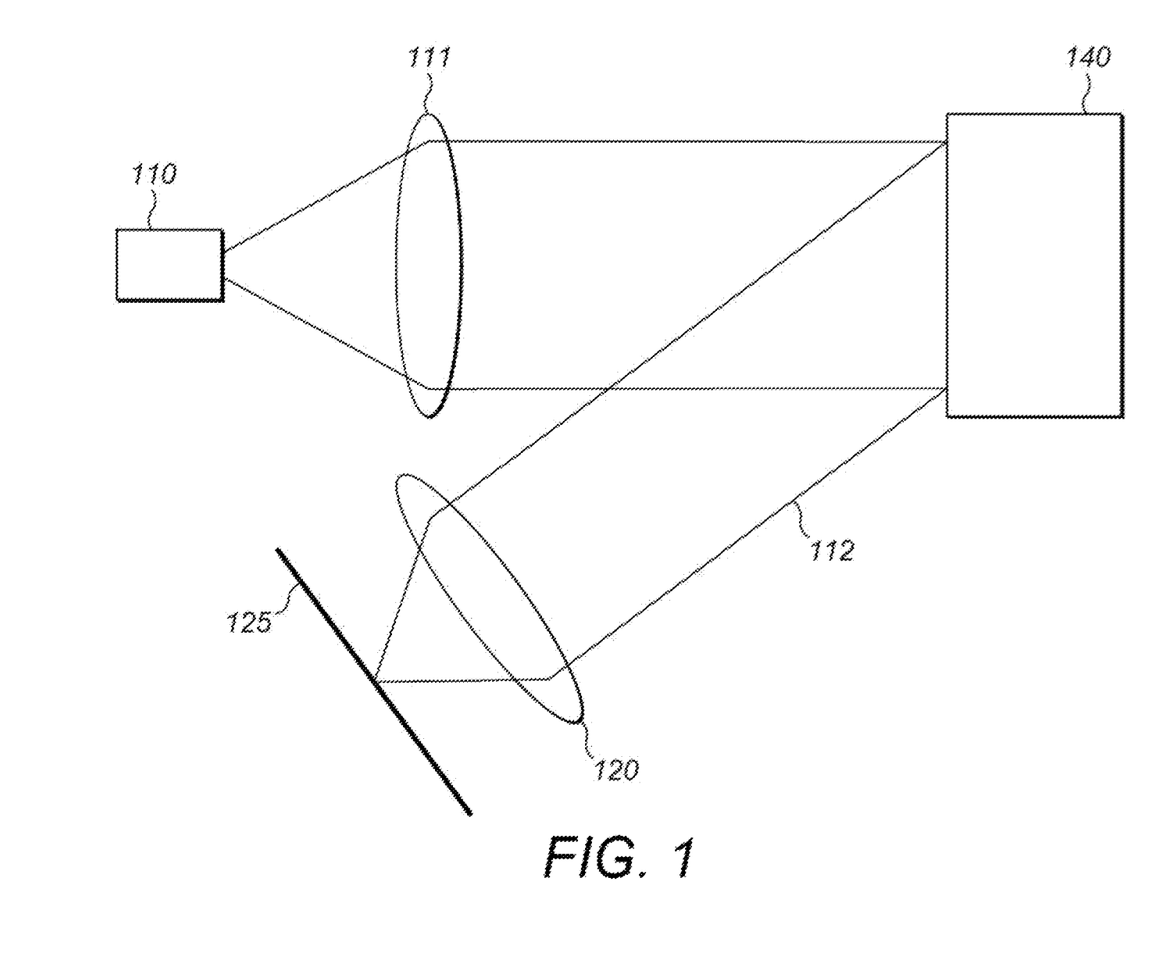
FIG. 1 is a schematic showing a reflective SLM, such as a LCOS, arranged to produce a holographic reconstruction at a replay field location.

FIG. 1 shows an example of using a reflective SLM, such as a LCOS-SLM, to produce a holographic reconstruction at a replay field location, in accordance with the present disclosure.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens (120) receives a beam of phase-modulated light exiting from the SLM and performs a frequency-space transformation to produce a holographic reconstruction at the screen (125) in the spatial domain.

In this process, the light—in the case of an image projection system, the visible light—from the light source is distributed across the SLM (140), and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

A holographic projector may be provided using such technology. Such projectors have found application in head-up displays for vehicles and near-eye devices, for example.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $\frac{1}{75}^{th}$ of a second, then the green laser would be fired for $\frac{1}{75}^{th}$ of a second, and finally the blue laser would be fired for $\frac{1}{75}^{th}$ of a second. The next frame would then be produced, starting with the red laser, and so on.

Another alternative method, that will be referred to as "spatially separated colours" (SSC) involves all three lasers being fired at the same time, but taking different optical paths, e.g. each using a different SLM or different spatial areas on the same SLM, and then combining to form the colour image.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image.

Holographic colour display systems suffer from two significant problems. Firstly, a mismatch between the physical size of the different colour holographic reconstructions. Secondly, the composite colour image is of low quality because of a resolution mismatch between the different colour holographic reconstructions.

The present disclosure addresses at least these problems.

SUMMARY

Aspects of an invention are defined in the appended independent claims.

There is provided a full colour display system comprising an optical system and a processing system, the optical system comprising: one or more spatial light modulators arranged to display holographic data in the Fourier domain; multiple light sources arranged to illuminate the spatial light modulator(s); a viewing system arranged to produce a virtual image of the 2D holographic reconstruction; and wherein the processing system is arranged to: combine Fourier domain data representative of a 2D image with Fourier domain data representative of a phase only lens for each colour to produce first holographic data, and provide the first holographic data to the optical system to produce a virtual image.

The Fourier domain data representative of each 2D colour image may be combined with Fourier domain data representative of a phase only lens; wherein the focal length of the phase only lens is inversely proportional to the wavelength of the colour.

The zero-order block may be formed on a dichroic mirror.

The spatial light modulator may be a reflective LCOS spatial light modulator.

The optical power of the phase only lens may be user controlled.

The display system may comprise a near-eye display.

The display may be part of a HUD.

The replay fields may be spatially remote from the viewer.

The display system may further comprise a spatial filter configured to selectively block at least one diffraction order of the 2D holographic reconstruction and, optionally, the zero order.

The display system may include a Fourier transform lens and a zero order block arranged to produce a 2D holographic reconstruction in the spatial domain corresponding to the holographic data.

The virtual images may be sequential frames of a 2D video.

The pixelated array may consist of pixels having a diameter less than 15 µm.

There is also provided a method of displaying images comprising: combining holographic image data and lensing data to a number of spatial light modulators; illuminating the spatial light modulators, each with a different collimated laser beam; applying the resultant light to an optical system for forming a virtual image; and reconstructing, by Fourier transformation, the individual colour images at the same plane to form a colour replay field where each single colour image has the same size.

The method may further comprise spatially filtering the resultant light from the SLM to selectively block at least one diffraction order of the 2D holographic reconstruction.

In some embodiments, the hologram is calculated using an algorithm based on the Gerchberg-Saxton algorithm such as described in British patent 2,498,170 or 2,501,112 which are hereby incorporated in their entirety by reference. However, some embodiments relate to Fourier holography and Gerchberg-Saxton type algorithms by way of example only. The present disclosure is equally applicable to Fresnel holography and holograms calculated by other techniques such as those based on point cloud methods.

The term "hologram" is used to refer to the recording which contains amplitude and/or phase information about the object. The term "holographic reconstruction" is used to refer to the optical reconstruction of the object which is formed by illuminating the hologram. The term "replay field" is used to refer to the plane in space where the holographic reconstruction is formed. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

In some embodiments, the spatial light modulator is a phase-only spatial light modulator. These embodiments are advantageous because no optical energy is lost by modulating amplitude. Accordingly, an efficient holographic projection system is provided. However, the present disclosure may be equally implemented on an amplitude-only spatial light modulator or an amplitude and phase modulator. It may be understood that the hologram will be correspondingly phase-only, amplitude-only or fully-complex.

The term "light" is used herein in its broadest sense. Some embodiments are equally applicable to visible light, infrared light and ultraviolet light, and any combination thereof.

Reference is made to holographic data comprising an image component and a lensing component to reflect that the holographic data is formed by the combination (such as vector addition) of first holographic data which corresponds to the image and second holographic data which collectively provide a lensing effect to received light. In some embodiments described herein, each holographic data is a 2D array of data values. The first holographic data may be said to correspond to the image because it contains information sufficient to form—such as recreate or reconstruct—the image.

In some embodiments described herein, the first holographic data may be said to correspond to an image because it is a frequency (or Fourier) domain representation of the image. The second holographic data may be said to collectively provide a lensing effect to received light because its effect on received light is the same as that of a physical lens. Examples are given in the detailed description of how this may be achieved. The second holographic data may be computationally-determined (or "software-defined") to provide any conceivable lensing effect or function—such as positive optical power, negative optical power or aberration correction, for example. In some embodiments disclosed herein, the second holographic data functions as a Fourier transform lens. That is, it manipulates received light in the same way as an appropriately-positioned Fourier transform optic such as a Fourier transform lens. In some such embodiments, the second holographic data perform an optical Fourier transform of the first holographic data. In this respect, it may be understood that the holographic data comprises a first component responsible for providing a first optical function (i.e. modulating light with data corresponding to the image) and a second component responsible for providing a second optical function (i.e. a Fourier transform).

The term "software-defined" (or "software-controllable") is used to reflect that the data is computational data or software data which may be changed or varied—including changed or varied in real-time—using software running on a computer. In this respect, the data may be considered dynamically-variable or simply "dynamic".

Some embodiments describe 1D and 2D holographic reconstructions by way of example only. In other embodiments, the holographic reconstruction is a 3D holographic reconstruction. That is, in some embodiments, each computer-generated hologram forms a 3D holographic reconstruction.

BRIEF DESCRIPTION OF THE DRAWINGS

Specific embodiments, based on the technology described above, will follow, by way of example only. It will be appreciated that routine variations can be made to alter the specific details provided herein. The examples are described with reference to the accompanying drawings, in which.

In the figures like reference numerals referred to like parts.

DETAILED DESCRIPTION OF THE DRAWINGS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In overview, a spatial light modulator (SLM) forms an array of phase-modulating elements that collectively form a phase-only representation of a desired image which can be reconstructed by correctly illuminating the SLM, to form a projector. The phase-only distribution may be referred to as a hologram. A Fourier transform lens is used to transform the holographic recording, which represents the object for reconstruction, into an "image". The image may be described as the holographic reconstruction. The individual modulating elements of the SLM may be referred to as pixels. In embodiments, composite colour holographic reconstructions are provided by combining a plurality of monochromatic holographic reconstructions.

Light is incident across the phase-modulating layer (i.e. the array of phase modulating elements) of the SLM. Modulated light exiting the phase-modulating layer is distributed across the replay field. Notably, in the disclosed types of holography, each pixel of the hologram contributes to the whole reconstruction. That is, there is not a one-to-one correlation between specific points on the replay field and specific phase-modulating elements.

The position of the holographic reconstruction in space is determined by the dioptric (focusing) power of the Fourier transform lens. In some embodiments, the Fourier transform lens is a physical lens as per the example shown in FIG. 1. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. However, in other embodiments, the Fourier transform is performed computationally by including lensing data in the holographic data. That is, the hologram includes data representative of a lens as well as data representing the object.

It is known in the field of computer-generated hologram how to calculate holographic data representative of a lens. The holographic data representative of a lens may be referred to as a software-defined lens or software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated hologram how to calculate such holographic data and combine it with holographic data representative of the object. For example, a phase-only holographic grating may be formed by modeling the phase delay caused by each point on the surface of a blazed grating. An amplitude-only holographic grating may be simply superimposed on an amplitude-only hologram representative of an object to provide angular steering of an amplitude-only hologram.

The so-called "Fourier path length" is the optical path length from the Fourier transform lens to the corresponding holographic reconstruction. The size of the holographic reconstruction, I, is related to the Fourier path length as follows:

$$I[x, y] = 2 \cdot f \cdot \tan\left(\sin^{-1}\left(\frac{\lambda}{2 \cdot p[x, y]}\right)\right) \quad (1)$$

where f is the Fourier path length, λ is the wavelength of the light and p is the size of the pixel on the SLM.

It may therefore be understood that for any given Fourier path length and spatial light modulator pixel size, differing hologram reconstruction sizes will result for different colours. For example:
f=300 mm
Red (λr)=640 nm
Green (λg)=532 nm
Blue (λb)=450 nm
p[x,y]=8 um This gives rise to three different sized hologram reconstructions:
Red=24.02 mm,
Green=19.96 mm, and
Blue=16.88 mm.

Figure 2:
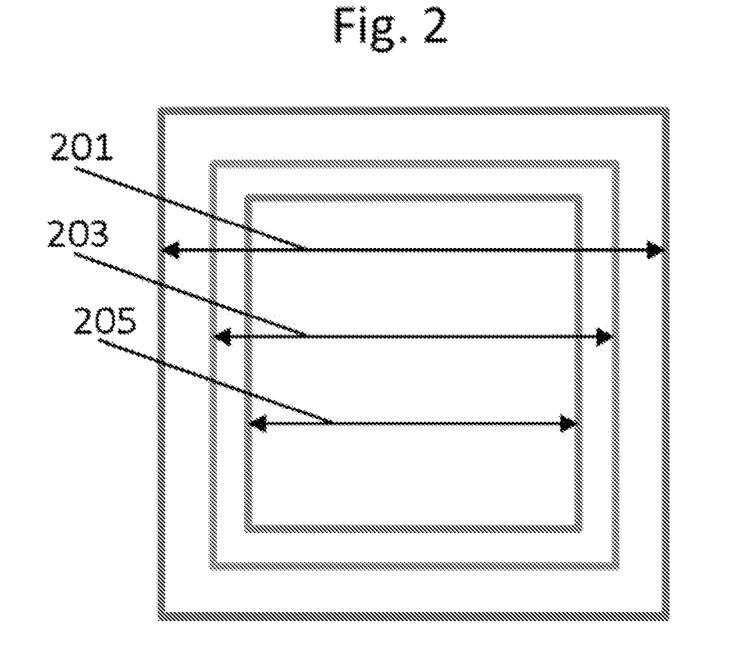
FIG. 2 depicts a composite colour holographic reconstruction in accordance with prior art.

In prior systems, since the Fourier path length is the same for all of the colour channels, the hologram reconstruction as shown in FIG. 2 will result.

FIG. 2 depicts a red holographic reconstruction 201, a green holographic reconstruction 203 and a blue holographic reconstruction 205 co-axially aligned at a reply plane.

The largest full colour image (the area where red, green and blue overlap) is limited by the size of the blue hologram reconstruction. This presents a further problem: it is desirable to calculate hologram reconstructions using a single computation engine. Ideally the same resolution would be calculated for each image, however, if this were the case, the resolution of each colour of the full colour image would be different. For example:

Hologram Resolution [X, Y]=1024×1024.

Full Colour Area: Blue Resolution [X, Y] = 1024.

Full Colour Area: Green Resolution [X, Y] = $\frac{1024}{19.96 \text{ mm}} \cdot 16.88 \text{ mm} = 866$ Full Colour Area: Red Resolution [X, Y] = $\frac{1024}{24.02 \text{ mm}} \cdot 16.88 \text{ mm} = 720$ It is undesirable for the individual wavelengths (colours) to have differing resolutions within the full colour image area, as this leads to a degradation in image quality.

A solution is to vary the resolution of the computed hologram to ensure all colours have the same resolution with the full colour area.

The resolution is determined as follow:

Full Colour Area: Blue Resolution [X, Y] = 1024.

Full Colour Area: Green Resolution [X, Y] = $\frac{1024}{16.88 \text{ mm}} \cdot 19.96 \text{ mm} = 1210$ Full Colour Area: Red Resolution [X, Y] = $\frac{1024}{16.88 \text{ mm}} \cdot 24.02 \text{ mm} = 1458$ However, computationally, this is undesirable because the blue channel is a power of 2 number (i.e. 2^10=1024) and is computed efficiently using an FFT. The Red and Green channels are no long power of 2 numbers and more importantly are significantly higher resolution. Given that the computation requirements of FFTs are logarithmic, any increase in resolution is undesirable.

The inventors have recognised that it is advantageous to use different Fourier path lengths for each colour channel. The different Fourier path lengths are determined by the use of Fourier lenses.

There is therefore provided a display system comprising: a first plurality of pixels arranged to display first holographic data corresponding to a first holographic reconstruction and receive light of a first wavelength; a second plurality of pixels arranged to display second holographic data corresponding to a second holographic reconstruction and receive light of a second wavelength; a first Fourier transform lens arranged to receive spatially modulated light having a first wavelength from the first plurality of pixels and perform an optical Fourier transform of the received light to form the first holographic reconstruction at a replay plane, wherein the first holographic reconstruction is formed of light at the first wavelength; a second Fourier transform lens arranged to receive spatially modulated light having a second wavelength from the second plurality of pixels and perform an optical Fourier transform of the received light to form the second holographic reconstruction at the replay plane, wherein the second holographic reconstruction is formed of light at the second wavelength, wherein the optical path length from the first Fourier transform lens to the replay plane is not equal to the optical path length from the second Fourier transform lens to the replay plane.

Figure 3:
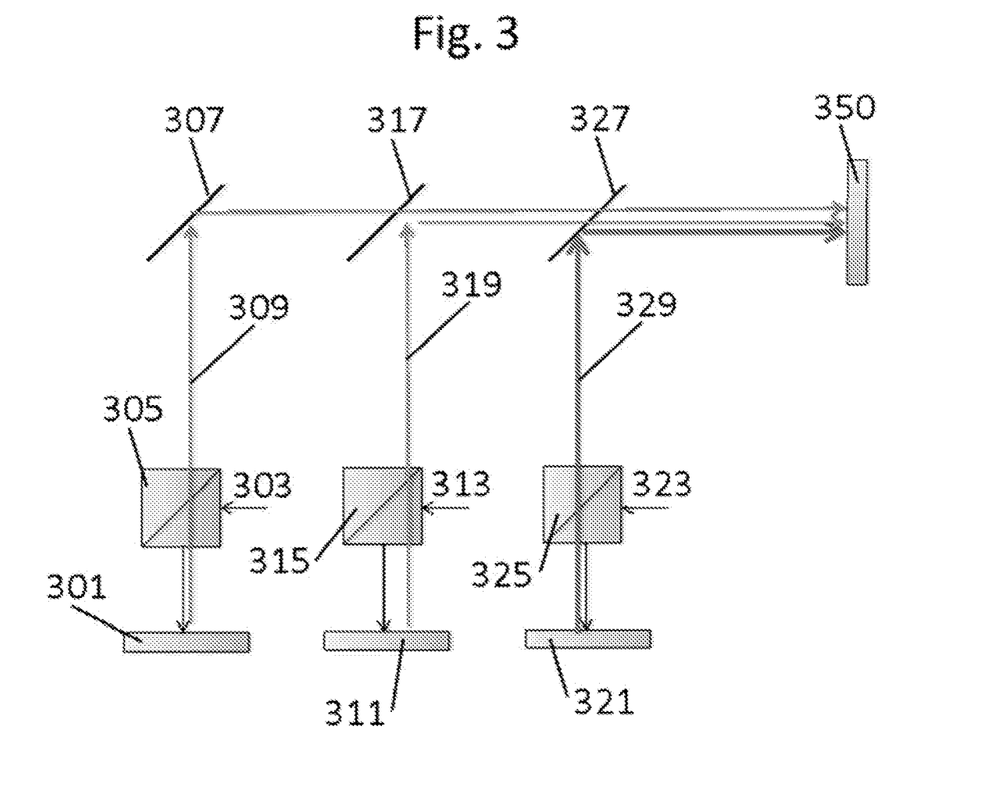
FIG. 3 depicts a first embodiment.

An embodiment is shown in FIG. 3 in which the respective Fourier path lengths are different.

FIG. 3 shows three colour channels by way of example only. The present disclosure is equally applicable to any plurality of light channels The first colour channel comprises a first SLM 301 arranged to receive blue light 303 via a first beam splitter 305. The blue light is spatially modulated by the SLM 301. The phase-modulation provided by SLM 301 comprises an image component and a Fourier lensing component. The SLM 301 is reflected and the spatially-modulated light is directed to the replay plane 350 by a mirror 307. Optionally, the mirror 307 comprises an aperture to remove zero-order diffracted light from the SLM 310. Likewise, there is provided a green channel comprising a second SLM 311 arranged to receive green light 313 via a second beam splitter 315. The green light is spatially modulated by the second SLM 311. The phase-modulation provided by second SLM 311 comprises an image component and a Fourier lensing component. The second SLM 311 is reflected and the spatially-modulated light is directed to the replay plane 350 by a second mirror 317. Optionally, the second mirror 317 comprises an aperture to remove zero-order diffracted light from the second SLM 311. Further likewise, there is provided a red channel comprising a third SLM 321 arranged to receive red light 323 via a third beam splitter 325. The red light is spatially modulated by the third SLM 321. The phase-modulation provided by third SLM 321 comprises an image component and a Fourier lensing component. The third SLM 321 is reflected and the spatially-modulated light is directed to the replay plane 350 by a third mirror 327. Optionally, the third mirror 327 comprises an aperture to remove zero-order diffracted light from the third SLM 321. In some embodiments, a light-receiving surface—such as a screen or diffuser—is positioned at the replay field 350.

In FIG. 3, the first optical path length 309 from SLM 301 to the replay plane is greater than the second optical path length 319 from second SLM 311 to the replay field which is in turn greater than the third optical path length 329 from third SLM 321 to the replay field. Each optical path length may be referred to as the "Fourier path length" for that channel because the Fourier lens is effectively on the SLM. It may therefore be understood that the Fourier path length is wavelength-dependent, optionally, inversely proportional to wavelength. Each Fourier path comprises a respective mirror, wherein at least one of the respective mirrors is a dichroic mirror. In some embodiments, the plurality of mirrors and replay plane are disposed on a common optical path. In some embodiments, the plurality of mirrors and replay plane are collinear.

The second mirror 317 is a first dichroic mirror which is substantially reflective to green light but substantially transmissive to blue light. The third mirror 327 is a second dichroic mirror which is substantially reflective to red light but substantially transmissive to green and blue light. The person skilled in the art is familiar with the use of dichroic coatings on mirrors to provide the functionality described.

FIG. 3 describes blue, green and red channels by way of example only and the present disclosure is applicable to any plurality of different wavelength channels. It will be apparent that the first mirror 307 does not need to be a dichroic mirror.

In some embodiments, the device comprises two light channels and one dichroic mirror (or mirror with a dichroic coating). In other embodiments, the device comprises three light channels and two different dichroic mirrors (or mirrors with a dichroic coating). In some embodiments, the device comprises n light channels and (n−1) different dichroic mirrors (or mirrors with a dichroic coating). Again, the person skilled in the art will know how to provide the necessary dichroic mirror/s or different dichroic coatings on mirror/s to achieve the optical transmittance/reflectance described.

The use of (n−1) dichroic mirrors—where n is the number of light channels—allows the different colour channels to be directed onto a common optical axis to the replay plane. In particular, the colour channels are collinear in the region from the final mirror to the replay plane. The described use of at least one dichroic mirror therefore provides substantially collinear optical paths. Referring back to FIG. 3 by way of example, the second mirror 317 directs the green light onto a common optical path with the blue light and the third mirror 327 directs the red light onto said common optical path with the blue and green light.

The display device therefore comprises a collinear optical path for the plurality of colour channels, wherein the colour channels have different Fourier path lengths. This collinear optical path helps with optical alignment, stray light management and helps keep the device compact. Notably, the first mirror 307 of FIG. 3 may be independently aligned—that is without affecting the green or red light paths. When the blue light is aligned at the replay field using the first mirror 307, the second mirror 317 may be aligned without affecting (e.g. misaligning or moving out of alignment) the blue light. Finally, the red light may then be aligned without affecting (e.g. misaligning or moving out of alignment) the blue or green light. There is therefore provided a device which is easier to align. There is also provided an improved method of aligning a display device having a plurality of colour channels.

Figure 4:
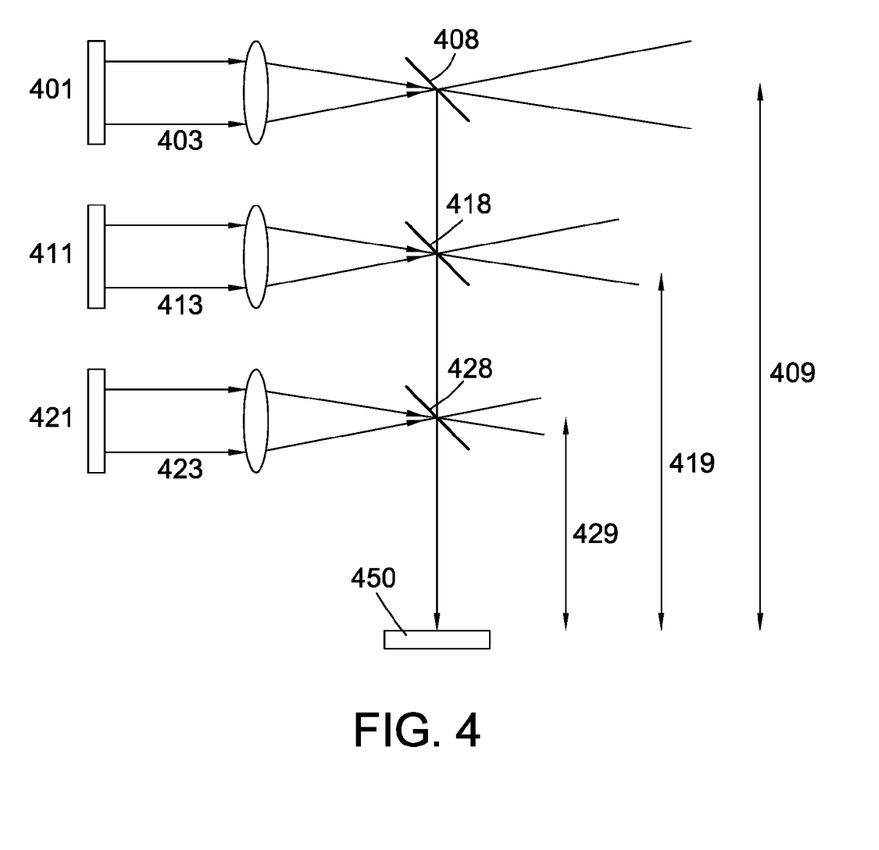
FIG. 4 depicts a second embodiment.

Another embodiment is shown in FIG. 4.

FIG. 4 is substantially identical to FIG. 3 but the beam splitters have been omitted for simplicity. Any number of different optical configuration for illuminating the spatial light modulators may be conceived. FIG. 4 additionally shows a physical lens on each colour channel which focuses zero-order (i.e. unmodulated) light received from the spatial light modulator through an aperture in the corresponding mirror 408/418/428 and out of the system. The modulated light from each spatial light modulator may be focused to a different plane in space by adding optical power to the respective holographic data, for example. Accordingly, a method of removing the zero-order light from each colour channel is provided without adversely affecting the holographic reconstruction. The arrows on the light rays in FIG. 4 merely illustrate the direction of illumination of each spatial light modulator and the direction of reconstruction. For the avoidance of doubt, the zero-order light travels from left to right as shown in FIG. 3.

In more detail, a further embodiment is shown in FIG. 4 comprising a blue channel 403, a green channel 413 and a red channel 423. The blue channel 403 comprises an SLM 401 and mirror 408 arranged to direct spatially-modulated light from SLM 401 to the replay field 450. The green channel 513 comprises a second SLM 411 and second mirror 418 arranged to direct spatially-modulated light from the second SLM 411 to the replay field 450. The red channel 423 comprises a third SLM 421 and a third mirror 428 arranged to direct spatially-modulated light from the third SLM 421 to the replay field 450. In some embodiments, a light-receiving surface—such as a screen or diffuser—is positioned at the replay field 450. Again, each mirror 401, 418 and 428 comprises a central aperture arranged to remove zero-order diffracted light from the system. In FIG. 4, the distance 409 is greater than distance 419 which is in turn greater than distance 429.

In particular, the inventors have recognised that by forming the full colour image in this manner, the number of pixels in the image for each colour is constant, thereby enabling a common computation engine to be used for all three colour channels. Conveniently, the optical configuration, shown in FIG. 3, is advantageous from a packaging perspective as the need to mix colour channels requires dichroic mirrors to be spatially displaced and this spatial displacement may be used as part of the variable Fourier path lengths.

In embodiments, the wavelength-dependant path lengths may be determined as follows:

$$f(\lambda) = \frac{I[x, y]}{2 \cdot \tan\left(\sin^{-1}\left(\frac{\lambda}{2 \cdot p[x, y]}\right)\right)} \quad (2)$$

where f=Fourier path length, I=size of the holographic reconstruction, $\lambda$=wavelength of each colour channel and p=size of the pixel on the SLM.

For example, the Fourier path length (Fourier lens focal length [FL]) may be determined for each wavelength as follows:

I=30 mm
Red ($\lambda r$)=640 nm
Green ($\lambda g$)=532 nm
Blue ($\lambda b$)=450 nm
p[x,y]=8 um This gives rise to three different sized hologram reconstructions:

Red FL=374.7 mm
Green FL=450.9 mm
Blue FL=533.1 mm

In embodiments, there is therefore provided a full-colour virtual image where the size of each individual colour image is the same. That is, it may therefore be understood that, in embodiments, the first optical path length and second optical path length are such that the first holographic reconstruction and second holographic reconstruction are the same size. The inventors have recognised that, advantageously, the first optical path length and second optical path length may be such that the first holographic reconstruction and second holographic reconstruction have the same resolution. In embodiments, the problem of the mismatch in physical size and the mismatch in resolution are simultaneously addressed.

The system in accordance with the present disclosure is not obvious because historically the Fourier lens are physical lenses and creating three physical lenses with precisely the correct focal lengths to cause three different wavelengths to diffract to exactly the same size is generally considered impracticable, especially when you consider that the focal length tolerance of an average lens is 5%. However, the inventors have recognised that these acceptable practical disadvantages are out-weighted by the gains in image quality which can be achieved in accordance with the present subject-matter. In further advantageous embodiments, the Fourier lens is integrated into the hologram as a phase-only lens to make the system further viable because the practical disadvantages are yet further out-weighed. In particular, the inventors have recognised that with pixels small enough, a phase only Fourier lenses of sufficient strength may be made (large pixels and short focal length phase-only lens leads to aliasing and image distortion).

It will be apparent that, in embodiments, the first holographic reconstruction and second holographic reconstruction are coincident. Accordingly, a composite colour holographic reconstruction of a polychromic object may be provided. The first holographic reconstruction represents a first wavelength component of an object and the second holographic reconstruction represents a second wavelength component of the object. The present disclosure is not limited to Fourier holography but, in some embodiments, the first holographic data represents a first wavelength component of the object in the frequency domain and the second holographic data represents a second wavelength component of the object in the frequency domain.

The Fourier lens may be a phase-only lens forming part of the respective holographic data (i.e. hologram). The Fourier lens may be a physical optic.

In embodiments, the first Fourier transform lens is a first physical optic. In these embodiments in particular, the zero-order removal apertures described may optionally be included on the mirrors and optical power added to the holographic data such that the corresponding holographic reconstruction and zero-order light are brought to a focus at different planes on the optical path. In other embodiments, the first Fourier transform lens is first lensing data of the first holographic data. That is, the first holographic data comprises an image component and a lensing component, wherein the lensing component is the first Fourier transform lens. In embodiments in which the Fourier transform lens is computationally provided on the SLM, it may be understood that the first lensing data is software-defined.

Likewise, in embodiments, the second Fourier transform lens is a second physical optic. In other embodiments, the second Fourier transform lens is second lensing data of the second holographic data. That is, the second holographic data comprises an image component and a lensing component, wherein the lensing component is the second Fourier transform lens. In embodiments in which the Fourier transform lens is computationally provided on the SLM, it may be understood that the second lensing data is software-defined.

In further advantageous embodiments, the first Fourier transform lens is a physical optic and the second Fourier transform lens is lensing data of the second holographic data, or vice versa.

The skilled person will readily understand that Equation 2 may be equally applied to different colours/wavelengths to determine different Fourier path lengths in accordance with the present disclosure. In embodiments, the first wavelength is red light and the second wavelength is green light. That is, the first wavelength is a wavelength or range of wavelengths in the region (or band) of the electromagnetic spectrum corresponding to red light. Likewise, the second and third wavelengths are respective wavelengths or ranges of wavelengths in the region (or band) of the electromagnetic spectrum corresponding to green and blue light, respectively.

It may therefore be understood that, in embodiments, the first wavelength is greater than the second wavelength and the optical path length from the first Fourier transform lens to the replay plane is less than the optical path length from the second Fourier transform lens to the replay plane. In embodiments, the focal length of the Fourier transform lens is inversely proportional to the wavelength of the corresponding light.

In embodiments, the SLMs are reflective LCOS SLMs. In other embodiments, the SLMs are transmissive or MEMs based SLMs. In embodiments, the SLMs are phase-modulating only (i.e. not amplitude-modulating). In embodiments, the first holographic data corresponds to a first phase-delay distribution and the second holographic data corresponds to a second phase-delay distribution. In other embodiments, the SLMs are amplitude-modulating or amplitude and phase-modulating. That is, in embodiments, the first plurality of pixels are provided by a first spatial light modulator, optionally, a first reflective LCOS spatial light modulator and the second plurality of pixels are provided by a second spatial light modulator, optionally, a second reflective LCOS spatial light modulator. In embodiments, each pixel has a diameter less than 15 µm.

In embodiments, a zero-order removal element is provided for one or more of the colour channels. The zero-order removal element may be considered a spatial filter. Advantageously, removal of the zero-order light increases the signal-to-noise ratio of the holographic reconstruction. In embodiments, the system therefore further comprising a first spatial filter on the optical path from the first Fourier transform lens to the replay plane arranged to prevent zero-order diffracted light of the first wavelength reaching the replay plane and/or a second spatial filter on the optical path from the second Fourier transform lens to the replay plane arranged to prevent zero-order diffracted light of the second wavelength reaching the replay plane.

In embodiments, the first and/or second spatial filter is/are incorporated on the respective dichroic mirror and comprises a first portion arranged to provide (or direct) the zero-order diffracted light on a first optical path and a second portion arranged to provide (or direct) the higher-order diffracted light on a second optical path. In embodiments, the first portion is an aperture and the second portion is a reflection (or reflective) portion.

In embodiments, the display system further comprises a first light source arranged to illuminate the first plurality of pixels with light of the first wavelength and a second light source arranged to illuminate the second plurality of pixels with light of the second wavelength. In embodiments, the light sources are substantially monochromatic. In embodiments, the light sources are (spatially) coherent light sources such as lasers.

It may be understood that the present teaching may be extended to more than two colour channels. In embodiments, red, green and blue colour channels are provided to produce a colour holographic reconstruction, further colour channels may be added for example red, green, yellow and blue.

In embodiments, the display system therefore further comprises a third plurality of pixels arranged to display third holographic data corresponding to a third holographic reconstruction and receive light of a third wavelength; a third Fourier transform lens arranged to receive spatially modulated light having a third wavelength from the third plurality of pixels and perform an optical Fourier transform of the received light to form the third holographic reconstruction at a replay plane, wherein the third holographic reconstruction is formed of light at the third wavelength, wherein the optical path length from the third Fourier transform lens to the replay plane is not equal to the optical path length from the second Fourier transform lens to the replay plane or the optical path length from the first Fourier transform lens to the replay plane.

In embodiments, the first holographic reconstruction, second holographic reconstruction and third holographic reconstruction are coincident. Accordingly, a high quality colour holographic reconstruction is achieved.

It may therefore be understand that in embodiments comprising three colour channels, the first optical path length, second optical path length and third optical path length are such that the first holographic reconstruction, second holographic reconstruction and third holographic reconstruction are the same size and have the same resolution. In embodiments, the third wavelength is blue light.

In embodiments, each holographic reconstruction is one frame of a sequence of 2D video frames. In embodiments, the replay plane is spatially remote from a viewer. That is, the replay field is presented as a virtual image The display system of the present disclosure may be used to form head up displays and head mounted displays, holographic projection displays inter alia. The display system allows for full colour holograms with the, full resolution of the replay field for each colour.

In some embodiments, the holographic projection system of the present disclosure is used to provide an improved head-up display (HUD) or head-mounted display or near-eye device. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

The invention is not restricted to the described embodiments but extends to the full scope of the appended claims.

The invention claimed is:

1. A display system comprising:
 a first plurality of pixels arranged to display first holographic data corresponding to a first holographic reconstruction, to receive light of a first wavelength and to spatially modulate the received light of the first wavelength;
 a second plurality of pixels arranged to display second holographic data corresponding to a second holographic reconstruction, to receive light of a second wavelength and to spatially modulate the received light of the second wavelength;

a first Fourier transform lens arranged to perform a Fourier transform of the spatially modulated light of the first wavelength to form the first holographic reconstruction at a replay plane, wherein the first holographic reconstruction is formed of light at the first wavelength;

a second Fourier transform lens arranged to perform a Fourier transform of the spatially modulated light of the second wavelength to form the second holographic reconstruction at the replay plane, wherein the second holographic reconstruction is formed of light at the second wavelength;

wherein an optical path length from the first Fourier transform lens to the replay plane is not equal to an optical path length from the second Fourier transform lens to the replay plane, wherein the focal length of each Fourier transform lens is inversely proportional to the wavelength of the corresponding spatially modulated light.

2. The display system of claim 1, wherein the first wavelength is greater than the second wavelength and the optical path length from the first Fourier transform lens to the replay plane is less than the optical path length from the second Fourier transform lens to the replay plane.

3. The display system of claim 1, wherein the first optical path length and second optical path length are such that the first holographic reconstruction and second holographic reconstruction are the same size.

4. The display system of claim 1, wherein the first optical path length and second optical path length are such that the first holographic reconstruction and second holographic reconstruction have the same resolution.

5. The display system of claim 1, wherein the first holographic reconstruction and second holographic reconstruction are coincident.

6. The display system of claim 1, wherein the first Fourier transform lens is a first physical optic arranged to receive spatially modulated light having the first wavelength from the first plurality of pixels.

7. The display system of claim 1, wherein the first holographic data comprises an image component and a lensing component, wherein the lensing component is the first Fourier transform lens.

8. The display system of claim 7, wherein the first Fourier transform lens is software-defined.

9. The display system of claim 1, wherein the second Fourier transform lens is a second physical optic arranged to receive spatially modulated light having the second wavelength from the second plurality of pixels.

10. The display system of claim 1, wherein the second holographic data comprises an image component and a lensing component, wherein the lensing component is the second Fourier transform lens.

11. A near-eye device or head-up display comprising the display system as claimed in claim 10.

12. The display system of claim 1, wherein the second Fourier transform lens is software-defined.

13. The display system of claim 1, wherein the first holographic reconstruction represents a first wavelength component of an object and the second holographic reconstruction represents a second wavelength component of the object.

14. The display system of claim 1, wherein the first holographic data corresponds to a first phase-delay distribution and the second holographic data corresponds to a second phase-delay distribution.

15. The display system of claim 1, further comprising:
a first light source arranged to illuminate the first plurality of pixels with light of the first wavelength; and
a second light source arranged to illuminate the second plurality of pixels with light of the second wavelength.

16. The display system of claim 1, wherein the first plurality of pixels are provided by a first spatial light modulator, optionally, a first reflective LCOS spatial light modulator and the second plurality of pixels are provided by a second spatial light modulator, optionally, a second reflective LCOS spatial light modulator.

17. The display system of claim 1, wherein the first wavelength corresponds to red light and the second wavelength corresponds to green light.

18. The display system of claim 1, further comprising a first spatial filter on the optical path from the first Fourier transform lens to the replay plane arranged to prevent zero-order diffracted light of the first wavelength reaching the replay plane and/or a second spatial filter on the optical path from the second Fourier transform lens to the replay plane arranged to prevent zero-order diffracted light of the second wavelength reaching the replay plane.

19. The display system of claim 18 wherein the first and/or second spatial filter is a dichroic mirror comprising a first portion arranged to provide the zero-order diffracted light on a first optical path and a second portion arranged to provide the higher-order diffracted light on a second optical path.

20. The display system of claim 19 wherein the first portion is an aperture and the second portion is a reflection portion.

21. The display system of claim 1, further comprising:
a third plurality of pixels arranged to display third holographic data corresponding to a third holographic reconstruction and to receive light of a third wavelength;
a third Fourier transform lens arranged to perform a Fourier transform of the light of the third wavelength to form the third holographic reconstruction at a replay plane, wherein the third holographic reconstruction is formed of light at the third wavelength;
wherein an optical path length from the third Fourier transform lens to the replay plane is not equal to the optical path length from the second Fourier transform lens to the replay plane or the optical path length from the first Fourier transform lens to the replay plane.

22. The display system of claim 21 wherein the first holographic reconstruction, second holographic reconstruction and third holographic reconstruction are coincident.

23. The display system of claim 21, wherein the first optical path length, second optical path length and third optical path length are such that the first holographic reconstruction, second holographic reconstruction and third holographic reconstruction are the same size and have the same resolution.

24. The display system of claim 21, wherein the third wavelength corresponds to blue light.

25. The display system according to claim 1, wherein each holographic reconstruction is one frame of a sequence of 2D video frames.

26. The display system according to claim 1, wherein each pixel has a diameter less than 15 μm.

* * * * *